United States Patent [19]
Lacroix et al.

[11] Patent Number: 6,050,298
[45] Date of Patent: Apr. 18, 2000

[54] SAFETY CIRCUIT BREAKER FOR PRESSURIZED-FLUID HANDLING INSTALLATION

[75] Inventors: Jean-Jacques Lacroix, Lovagny; Antoine Chambaud, Giez, both of France

[73] Assignee: Staubli Faverges, Faverges, France

[21] Appl. No.: 09/144,193

[22] Filed: Aug. 31, 1998

[30] Foreign Application Priority Data

Apr. 9, 1997 [FR] France .................................. 97 11187
Apr. 9, 1997 [FR] France .................................. 97 11188

[51] Int. Cl.⁷ .................................................. F16L 29/00
[52] U.S. Cl. ............................... 137/614.05; 137/614.03; 137/614.06; 251/149.6
[58] Field of Search ..................... 137/614.05, 614.06, 137/614.2, 614.03, 316; 251/149.6

[56] References Cited

U.S. PATENT DOCUMENTS

| | | |
|---|---|---|
| 2,279,146 | 4/1942 | Schneller . |
| 2,919,935 | 1/1960 | Nyberg . |
| 3,715,099 | 2/1973 | Shendure . |
| 4,398,561 | 8/1983 | Maldavs ............................. 137/614.05 |
| 4,664,148 | 5/1987 | Magnuson ......................... 137/614.05 |
| 4,674,535 | 6/1987 | de Menibus . |
| 5,044,401 | 9/1991 | Giesler et al. .................... 137/614.03 |
| 5,709,243 | 1/1998 | Wells et al. ....................... 137/614.03 |
| 5,806,564 | 9/1998 | Wilcox .............................. 137/614.05 |

FOREIGN PATENT DOCUMENTS

| | | |
|---|---|---|
| 178224 | 10/1985 | European Pat. Off. . |
| 2372371 | 6/1978 | France . |
| 1525664 | 7/1969 | Germany . |
| 3226227 | 1/1984 | Germany . |
| 323097 | 8/1957 | Switzerland . |
| 1531649 | 11/1978 | United Kingdom . |

*Primary Examiner*—Steven O. Douglas
*Assistant Examiner*—Khoa D. Huynh
*Attorney, Agent, or Firm*—Dowell & Dowell, P.C.

[57] ABSTRACT

Safety circuit breaker for a pressurized fluid handling installation wherein the circuit breaker includes a male element and a female element which are adapted to be connected axially with respect to one another such that, when assembled, the male element is connected to a sleeve mounted within the female element. Movement of the male element to a position of unlocking relative to the female element causes the internal sleeve to move from a first position to a second position wherein at least one orifice within the female element is blocked to prevent fluid flow therethrough. The at least one orifice is directed radially relative to the axis of the male and female element such that pressure against the sleeve is radial and not axial. A locking of the male element relative to the female element is created by balls which are carried by a slide which is elastically urged so as to force the balls into a groove in the male element.

17 Claims, 4 Drawing Sheets

SAFETY CIRCUIT BREAKER FOR PRESSURIZED-FLUID HANDLING INSTALLATION

FIELD OF THE INVENTION

1. Background of the Invention

The present invention relates to a safety circuit breaker for a pressurized-fluid handling installation such as, for example, an installation for charging volumes with combustible gas and, more particularly, an installation for filling automobile vehicle tanks with methane under pressure.

2. Brief Discussion of the Related Art

To fill an automobile vehicle tank in a relatively short time, the pressures used are of the order of 200 bars, and even 250 bars. Taking into account the high value of these pressures, all risk of leakage into the atmosphere must be avoided in view of the inflammable nature of the gas. Furthermore, there may always be the possibility of an untimely displacement of the tank during filling, which displacement may be due to a poor immobilization of the vehicle or to inattention on the part of the user, having for consequence the rupture of the pipe and the uncontrolled escape of the gas into the surrounding atmosphere.

Patent FR-B-2 708 078 discloses a circuit breaker for a pressurized-filid handling installation which makes it possible to avoid the risk of rupture of a flexible hose pipe during filling by allowing, under the effect of an axial traction exceeding a determined threshold, the sectioning of this pipe at a precise point, such sectioning being accompanied by the automatic obturation of the upstream portion of pipe connected to a source of fluid under pressure.

In this known circuit breaker, a ball is provided in the central canal of a male connector and rests against a seat so as to form a valve. Although this structure is suitable for conduits of small diameter, it cannot be easily employed for conduits of larger diameter, particularly greater than 10 mm. In fact, the pressure exerted on the ball generates an effort proportional to the square of the radius of the ball, this effort then being such as to plastically deform the seal, which may result in a leakage at the level of the valve.

In addition, the greater is the diameter of the ball, the higher is its inertia, with the result that the time of response to closure of the valve may become incompatible with the desired use.

In the known circuit breaker of FR-B-2 708 078, it is possible, after the circuit breaker opens due to a considerable traction on one of the pipes to which it is connected, to refit the female element in the male element without particular precaution. For example, in the example of a station for filling automobile vehicle tanks, a user of the known device may proceed himself with a fresh connection of the circuit breaker in order to continue to serve himself. This practice may prove dangerous insofar as a user is incapable of assessing the capacity of an installation to function correctly. In addition, it may be particularly useful, for good management of an installation incorporating a circuit breaker, to note the number of forced openings of this circuit breaker, so as to proceed in good time with a change, by way of precaution, in order to avoid any risk of poor functioning. This is not possible with the known device of the prior art.

It is a particular object of the present invention to overcome these drawbacks by proposing a safety circuit breaker capable of operating under high pressures and with conduits of relatively large diameter without risk of leakage at the level of the closure valve. The invention also aims at providing a circuit breaker of which any opening may be detected by the competent staff.

SUMMARY OF THE INVENTION

To that end, the invention relates to a safety circuit breaker for pressurized-fluid handling installation comprising two elements, male and female, which are fixed to the ends of two portions of pipe and which are adapted to fit axially in each other and locking, provoking opening of an internal valve, characterized in that it comprises a sleeve mobile between a position distant from at least one radial orifice for passage of the fluid and a position of obturation of this orifice, means for removably locking said sleeve with respect to a connector of the male element being provided, with the result that a displacement of the connector in the direction of the opening of the female element involves a displacement of the sleeve in the same direction opposite the radial orifice for passage of fluid.

Thanks to the invention, the sleeve performs the role of a valve which is displaced, not by a force of pressure, but by the positive action of the male connector. The circuit breaker of the invention functions correctly whatever the diameter of the conduits and the pressure of the fluid.

According to a first advantageous aspect of the invention, the circuit breaker comprises a row of balls disposed inside a hollow body of the female element, these balls being received in housings in the sleeve and intended to engage in an outer annular groove of the connector. These balls constitute efficient means for axially locking the sleeve with respect to the male connector.

According to another advantageous aspect of the invention, the sleeve is displaced by the male connector towards a position such that the pressurized fluid exerts on the sleeve an essentially radial and centripetal effort. The absence of axial effort avoids any risk of axial displacement of the sleeve under the effect of the pressure of the fluid.

According to another advantageous aspect of the invention, the radial orifice is provided to place an annular space arranged in the body of the female element around the hollow body, in communication with an inner canal of the male connector.

According to another advantageous aspect of the invention, the hollow body comprises an inner groove for receiving the balls, this groove allowing the balls to be retracted out of the outer annular groove of the connector, the inner groove of the hollow body therefore allowing the balls to be driven radially towards the outside so as to release the male connector at the end of an extraction stroke, which corresponds to the removable nature of the locking of the sleeve on the connector.

According to another advantageous aspect of the invention, the circuit breaker comprises a bush elastically urged in the direction of withdrawal of the male connector, this bush being provided with a flange adapted to penetrate inside the sleeve and to maintain the balls captive in the inner groove of the hollow body. The bush therefore contributes to the efficient locking of the sleeve with respect to the hollow body by maintaining the balls captive in the groove of the hollow body.

According to another advantageous aspect of the invention, the circuit breaker comprises a fluid-connection element housed inside the female element and comprising at least one canal for circulation of the fluid and an axial extension adapted to penetrate in the hollow body so as to determine the position of the hollow body in the body of the female element. The connection element therefore performs a double role, both concerning the flow of the fluid and concerning the positioning of the element constituting the circuit breaker. In particular, the bush may be provided to be in elastic abutment against the axial extension of the connection element inside the hollow body.

According to another advantageous aspect of the invention, the radial orifice for passage of the fluid is made in a ring serving as positioning stop of the hollow body. The ring therefore also performs a double fluid function and function of positioning certain elements constituting the circuit breaker.

The invention also relates to a safety circuit breaker for pressurized-fluid handling installation comprising two elements, male and female, which are fixed to the ends of two pipe portions and which are adapted to fit axially in each other, provoking the opening of an internal valve, the locking of the male element in the female element being effected with the aid of a row of balls which are mounted in a bore of a body of the female element and which are provided to engage radially in an annular groove made in the outer wall of a connector of the male element, said balls being carried by an elastically urged slide, characterized in that the means for elastically urging said slide are provided to push said slide towards a position in which said balls project inwardly of said slide, said slide then being in abutment against a stop limiting its movement towards the inside of said female element, so that the introduction of said male connector in said female element is prevented in this position.

Thanks to this aspect of the invention, after the circuit breaker has opened by traction on one or the other of the pipes, a user must want a competent person in maintenance who will proceed with the re-coupling of the male and female elements. The maintenance man may then proceed with strict checks and note the incident in order to keep a written record thereof.

According to an advantageous aspect of the invention, the female element comprises a two-part body formed by a principal body containing a valve and by an auxiliary body inside which the slide is mobile, these principal and auxiliary bodies being removably assembled. The removable or dismountable nature of the connection between the principal and auxiliary bodies allows an intervention on the slide with a view to displacing it towards a position in which the introduction of the male connection becomes possible.

It may be provided that the position in which the elastic urging means push the slide corresponds to the abutment of the slide against the principal body of the female element. In this way, when the auxiliary body is dismounted with respect to the principal body, the abutment of the slide is eliminated, with the result that the latter may be displaced towards a position allowing introduction of the male connector.

According to another advantageous aspect of the invention, the body of the female element comprises an inner annular groove for receiving the balls during a displacement of the slide against the elastic urging means this construction allows the ejection of the balls from the outer annular groove of the male connector during the movement of extraction of the latter from the female element. This construction therefore avoids destruction of the circuit breaker upon a considerable traction on the pipes to which it is connected.

The connector advantageously comprises a central canal equipped with a tab for supporting a float forming non-return valve. This aspect of the invention makes it possible, when the circuit breaker is opened, to avoid the fluid contained in a pipe connected to the male connector being released into the atmosphere.

According to a particularly advantageous aspect of the invention, the circuit breaker comprises a tool for displacing the slide, against the elastic return means, towards a position in which the balls are retracted, with the result that they do not project towards the inside of the slide. This tool, intended to be manipulated only by authorized staff, enables this staff member to reintroduce the male connector in the female element. In that case, this tool may be provided to be assembled with the auxiliary body in place of the principal body, the tool being provided with a stop for displacing the slide. In other words, the auxiliary body may be mounted on the tool in the manner in which it is mounted on the principal body, this assembly on the tool resulting in a displacement of the slide thanks to its stop of the tool.

According to another advantageous aspect of the invention, the tool comprises a hollow volume for receiving the male connector. This aspect of the invention allows the introduction of the male connector inside the auxiliary body while the auxiliary body is mounted on the tool.

BRIEF DESCRIPTION OF THE DRAWINGS

The invention will be more readily understood on reading the following description of an embodiment of a safety circuit breaker in accordance with its principle, given solely by way of example and with reference to the accompanying drawings, in which.

DESCRIPTION OF PREFERRED EMBODIMENT

Figure 1:
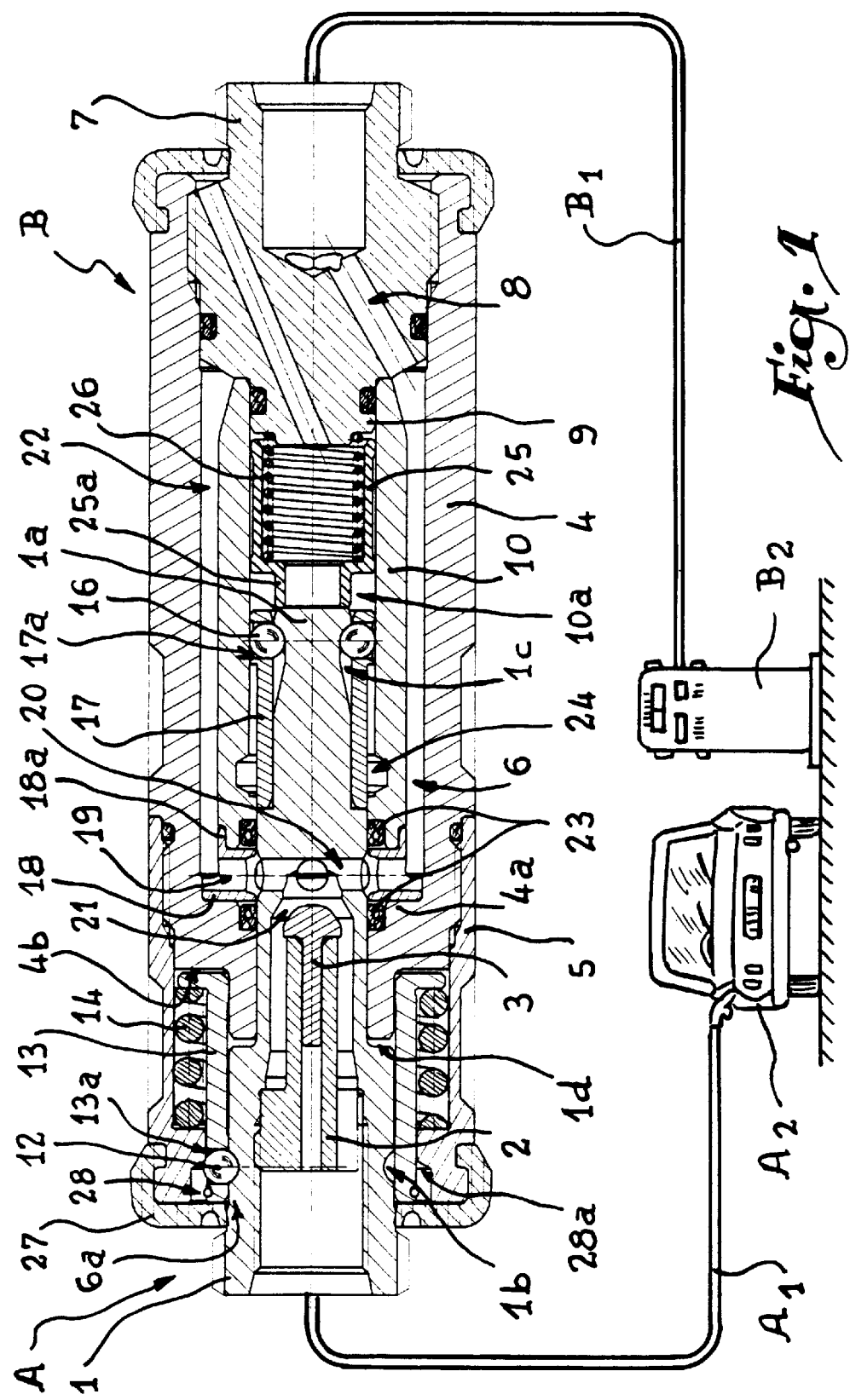
FIG. 1 is a schematic axial section showing the general arrangement of two male and female elements of a safety circuit breaker according to the invention.

Referring now to the drawings, the circuit breaker shown in FIG. 1 is constituted as a quick connect and comprises a male element A and a female element B both provided in tubular form. The male element A is formed by a connector 1 in the axial bore of which is provided a tab 2 for supporting a float 3 forming non-return valve. The rear part (not shown) of the connector 1 is connected to a downstream pipe portion $A_1$ which bears at its end a nozzle or equivalent member for filling a vehicle tank $A_2$.

The female element B is constituted by a principal body 4 and an auxiliary body 5 screwed on each other. The bodies 4 and 5 define a central bore 6 in which is housed the connector 1 in locked position. The principal body 4 of the female element B is connected to an upstream pipe portion $B_1$ which communicates with a source $B_2$ of pressurized gas supply.

Inside the bore 6 there is disposed a connecting piece or fluid-connection element 7 provided with at least one passageway 8 allowing the pipe $B_1$ and the central bore 6 to be placed in communication. Piece 7 is provided with an axial extension 9 around which is fitted a hollow body 10 which is also housed in the bore 6.

In the locked position shown in FIG. 1, the front end 1a of the connector 1 is housed in a central recess 10a in the hollow body 10.

A first row of balls 12 is captive in the housings 13a of a slide 13, housed in the bore 6 inside the auxiliary body 5 and elastically urged by a spring 14 in the direction of the principal body 4. The connector 1 is provided with a first outer annular groove 1b intended to receive the balls 12. In this way, in the position of FIG. 1, the balls 12 effectively lock the connector 1 inside the central bore 6.

Furthermore, a second row of balls 16 is provided captive in a sleeve 17 while the male connector 1 is provided, in the vicinity of its end 1a, with a second annular groove 1c for receiving the balls 16. The sleeve 17 is disposed around the connector 1 inside the central recess 10a of the hollow body 10.

A ring 18 is provided inside the bore 6 in abutment on a shoulder 4a of the principal body 4; this ring 18 comprises a flange 18a adapted to partially surround the hollow body 10 so as to define its position inside the bore 10. In other words, the ring 18 cooperates with the axial extension 9 to define the position of the hollow body 10 inside the central bore 6. The ring 18 is pierced with a plurality of radial orifices 19 in communication with the bore 6.

Figure 3:
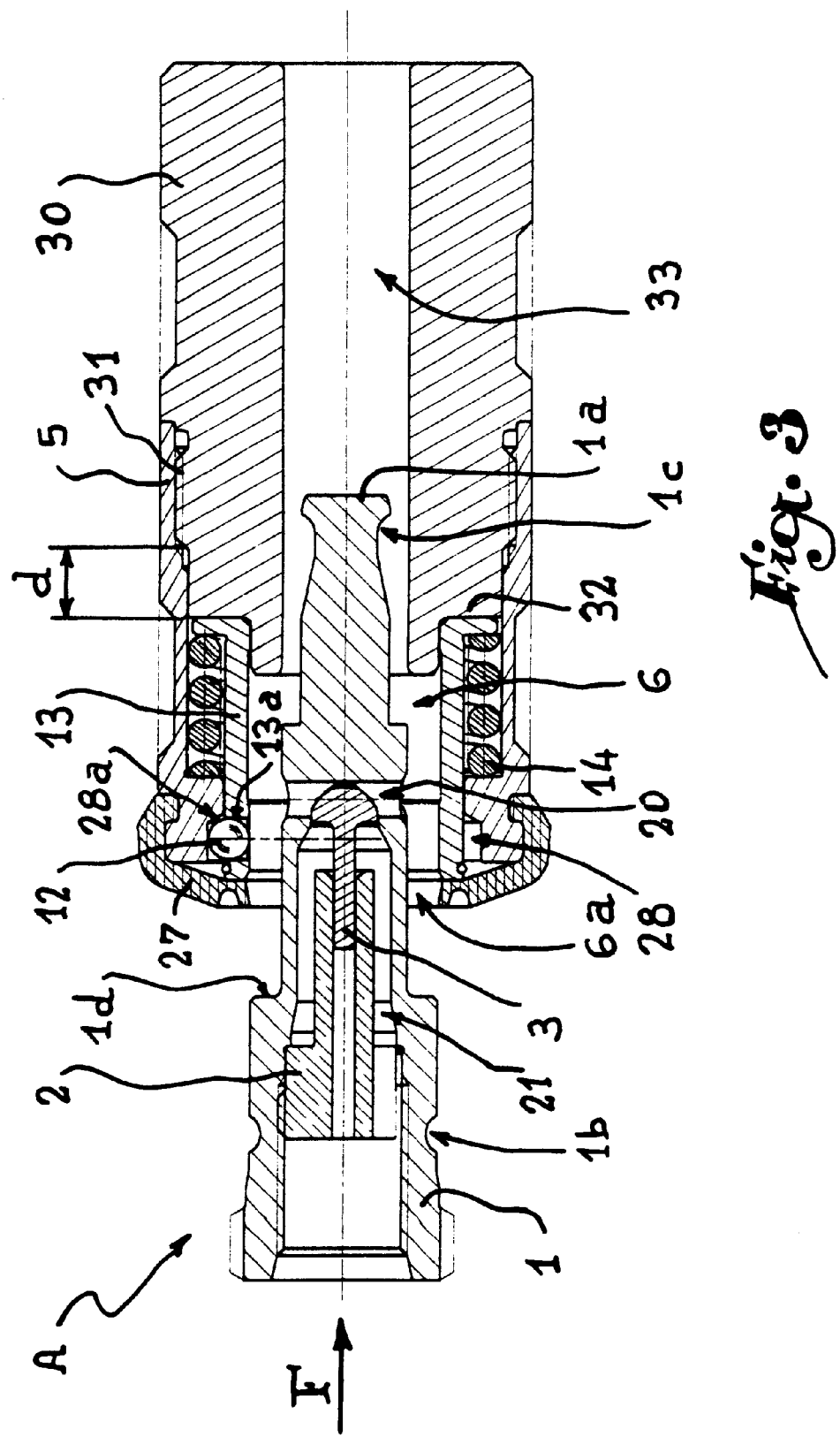
FIG. 3 shows the positioning of the male connector in a female part with a view to re-coupling the male and female elements.

In the position of FIG. 3, a radial passage 20 traversing right through the connector 1, lies opposite the orifices 19. The radial passage 20 opens out in an inner canal 21 in the connector 1 which is connected to pipe $A_1$.

The circulation of the gas between the pipes $B_1$ and $A_1$ takes place through the or each passageway 8, then in an annular space 22 defined in the bore 6 around the hollow body 10. The fluid then passes through the or each orifice 19 up to in the piercing 20 and the inner canal or channel 21 through which it circulates to pipe $A_1$.

Figure 2:
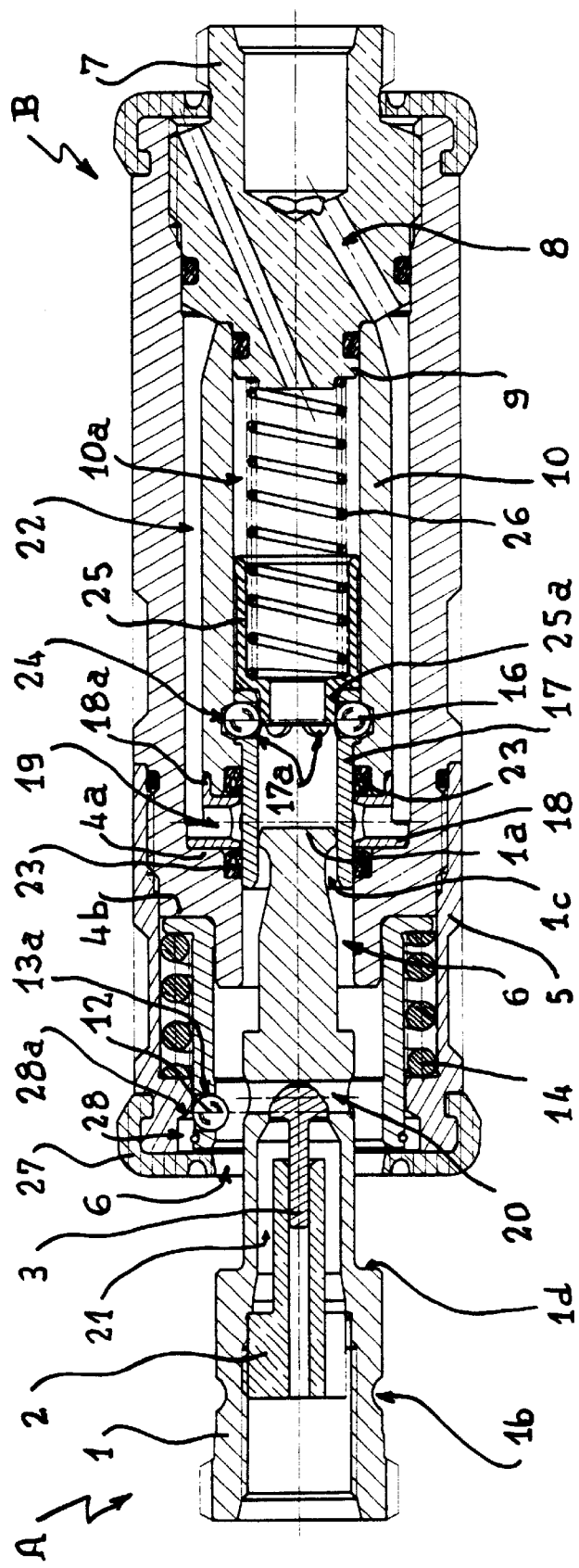
FIG. 2 illustrates the two elements visible in FIG. 1 at the moment when the male connector is withdrawn.

When, due to a considerable effort of traction exerted on element A or element B, these two elements are separated by translation of the connector 1 in the direction of the opening 6a of the central bore 6, the end 1a of the connector 1 entrains the balls 16 and the sleeve 17 in the direction of the opening 6a up to the position of FIG. 2.

In this position, the sleeve 17 obturates the orifices 19 with the result that the circulation of the fluid between pipes $B_1$ and $A_1$ is interrupted without risk of leakage. It will be noted that, whatever the value of the pressure prevailing in the pipe $B_1$ and whatever the diameter of the conduits used, the pressure exerted on the sleeve 17 is essentially radial and centripetal, with the result that it exerts on the sleeve 17 an effort which does not tend to displace this sleeve axially. Tightness of the closure of the valve is ensured by O-rings 23 disposed around the orifices 19.

In the position of FIG. 2, the balls 16 have been displaced by the groove 1c of the connector 1 up to opposite an inner groove 24 of the hollow body 10. The balls 16 may be retracted in the direction of the groove 24, which allows release of the end 1a of the connector 1 by ejection of the balls 16 outside the second groove 1c. Groove 1c presents a rounded profile towards the end 1a of the connector 1 in order to facilitate this ejection.

A bush 25 is provided inside the central recess 10a of the hollow body 10 in elastic abutment on the extension 9 thanks to a spring 26. During the movement of extraction of the connector 1, the bush 25 is in abutment against the end 1a of the connector 1. When the balls 16 are driven in the direction of the groove 24, the front part of the bush 25, which is in the form of a flange 25a, of diameter adapted to penetrate inside the sleeve 17, is housed in the end of the sleeve 17 so as to maintain the balls 16 in position inside the housings 17a provided for them in the sleeve 17. The balls 16 are thus blocked in the groove 24, with the result that the sleeve 17 cannot be displaced axially. This constitutes an additional safety element. In fact, even if a user inserts an elongated object, such as the tip of a screwdriver, inside the element B and if he presses on the exposed part of the sleeve 17, he cannot displace this sleeve, since the latter is locked in position with respect to the hollow body 10 thanks to the balls 16. The bush 25 therefore ensures, thanks to flange 25a, a particularly efficient locking of the sleeve 17 in position of obturation of the orifices 19.

In order to pass from the position of FIG. 1 to the position of FIG. 2, the balls 12 had to be driven from the first groove 1b of the connector 1. To that end, the slide 13 was displaced in the direction of the opening 6a of the bore 6 against the force of the spring 14 and by deforming a tight elastomer cap 27. The displacement of the slide 13 in the direction of the opening 6a makes it possible to bring the balls 12 opposite an inner groove 28 in the auxiliary body 5. The diameter and geometry of the housings 13a and of the balls 12 in the slide 13 are provided so that they do not drop inside the central bore 6, even in the absence of the connector 1.

In the position of FIG. 2, it is understood that a fresh introduction of the connector 1 in the direction of piece 9 cannot be made, insofar as a front shoulder 1d of the connector 1 abuts against the balls 12. As the slide 13 is in abutment against a shoulder 4b of the principal body 4, the slide 13 cannot be displaced up to a position in which the balls might be driven radially towards the outside. The balls therefore project in the bore 6, with the result that the connector 1 is blocked outside the body of the element B formed by elements 4 and 5.

In this way, when the circuit breaker of the invention has been opened due to a considerable traction on one or the other of its component elements, it is not possible to re-couple these elements easily, which avoids a user of a service station equipped with such a connection to put these elements back in place himself. The user must necessarily warn a qualified person who will proceed with replacing the elements after having made the necessary checks.

In the position of FIG. 2, it is noted that, due to the pressure prevailing in the pipe $A_1$, the float 3 is pushed in the direction of the end 1a of the connector 1, with the result that it obturates the radial passage 20. In this way, escape of the gas contained in the pipe $A_1$ is limited to the time of displacement of the float 3.

A tool 30 is provided to allow re-coupling of the male and female elements. This tool, which is visible in FIG. 3, comprises a thread 31 enabling it to be assembled with the auxiliary body 5 in place of the principal body 4. The tool 30 comprises an annular shoulder 32 of which the distance d with respect to the front of the thread 31 is greater than the distance separating the shoulder 4b from the corresponding thread on the principal body 4. In this way, when the auxiliary body 5 is mounted on the tool 30 in the manner shown in FIG. 3, the shoulder 32 pushes the slide 13 against the force of the spring 14, so that the balls 12 are brought opposite the inner groove 28 of the body 5.

In this position, the balls may be retracted inside this groove, with the result that the connector 1 may be introduced, in the direction of arrow F, in the assembly formed by the body 5 and the tool 30. To that end, the tool 30 comprises a hollow central canal 33 for receiving the end 1a of the connector 1.

When the connector 1 has been introduced in the assembly formed by elements 5 and 30, its groove 1b is disposed opposite the balls 12. It is then possible to unscrew the tool 30 and the body 5, so that the spring 14 pushes the slide 13 in the direction of the end 1a of the connector 1, which has for its effect to displace the balls 12 against an inclined surface 28a of the groove 28 until these balls come into engagement in the groove 1b of the connector 1. In this way, after separation of the tool 30 and the auxiliary body 5, the connector 1 is firmly held in position inside the auxiliary body 5. This is shown on the left-hand side of FIG. 4.

Figure 4:
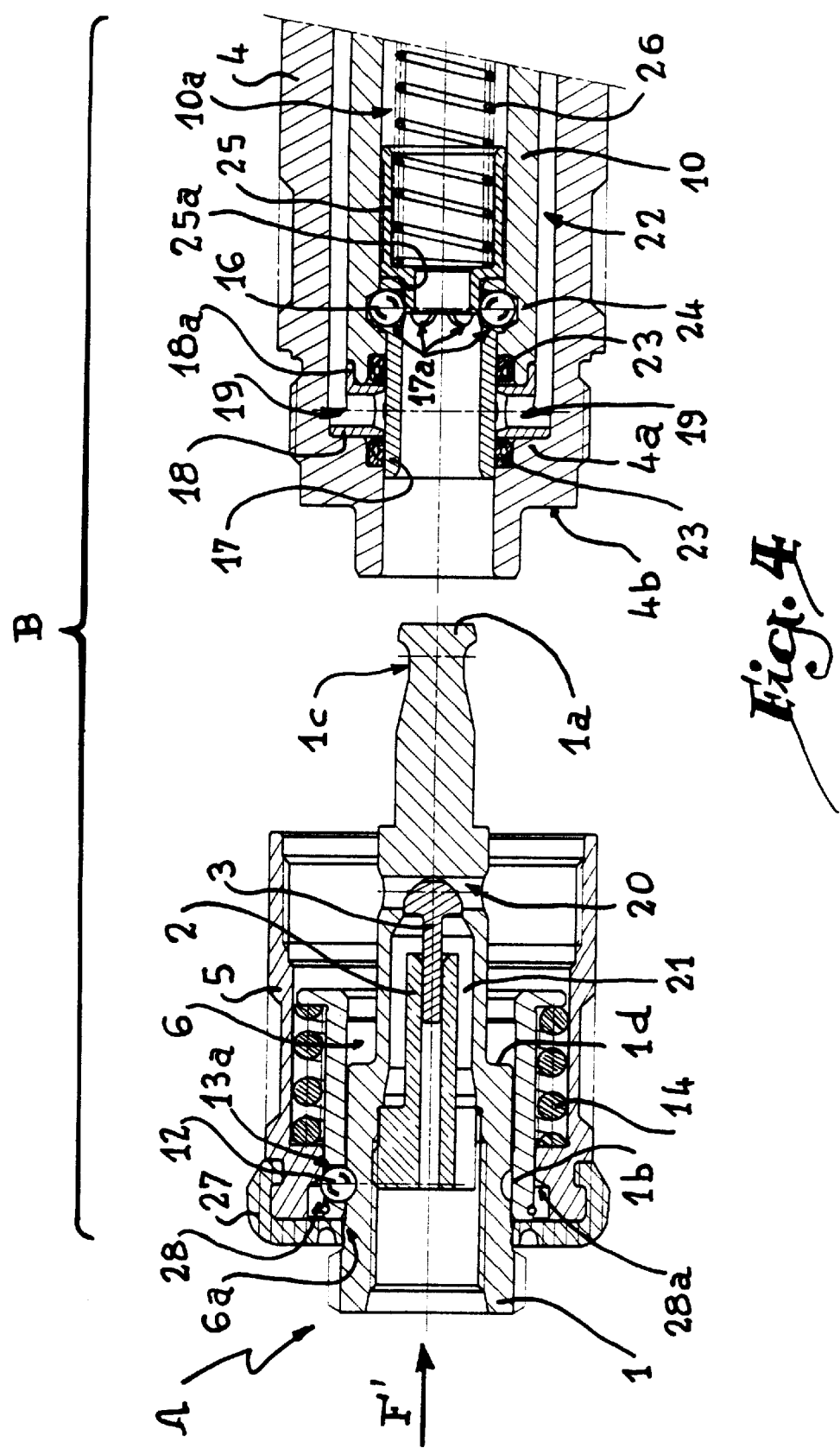
FIG. 4 shows a subsequent step of the re-coupling.

When it is necessary to close the circuit breaker of the invention again after having verified its correct state of operation, it suffices to screw the body 5 on the body 4, bringing the end 1a of the connector 1 up to contact with the flange 25a of the bush 25 in the direction of the arrow F' in FIG. 4. It is then understood that the end 1a of the connector 1 pushes the bush 25 against the force of the spring 26 and the balls 16 are received in the outer annular groove 1c of the connector 1.

The device is then in the position of FIG. 1 again. Taking into account the difference in pressure prevailing in the conduits $A_1$ and $B_1$, the float 3 is pushed in the direction of conduit $A_1$, with the result that the circulation of the fluid via the path set forth hereinabove is again possible.

The invention has been described with reference to an installation for supplying methane under pressure to an automobile vehicle. It is, however, obvious that numerous other applications for the circuit breaker of the invention may be envisaged.

What is claimed is:

1. Safety circuit breaker for pressurized fluid handling installation comprising:

two elements, male and female, which are adapted to be fixed to ends of two portions of pipe and which male and female elements are adapted to fit axially in each other and become locked relative to one another, a sleeve mobile between a first position spaced from at least one orifice in said female element and extending radially relative to an elongated central axis of said male and female elements, said at least one orifice being adapted to provide a flow of the pressurized fluid to pass to the male element and a second position closing said at least one orifice to prevent flow of fluid to said male element, means for releasably locking said sleeve with respect to said male element when in said first position such that when said male element is moved within said female element in a direction to be disconnected therefrom, said sleeve is moved from said first position to said second position and is released from locking engagement with said male element.

2. The safety circuit breaker of claim 1, wherein said means for locking comprises balls disposed inside a hollow body of said female element, said balls being received in housings in said sleeve and engaging an outer annular groove in said male element when said sleeve is in said first position and said male element is inserted within said hollow body of said female element.

3. The safety circuit breaker of claim 2 wherein said at least one radial extending orifice communicates with an annular space in said female element and around said hollow body, with an inner channel in said male element.

4. The safety circuit breaker of claim 1, wherein pressurized fluid from said at least one radially extending orifice creates essentially a radial force on said sleeve when said sleeve is in said second position.

5. The safety circuit breaker of claim 2 wherein said hollow body comprises an inner groove for receiving said balls, said groove allowing retraction of said balls out of said outer annular groove of said male element.

6. The safety circuit breaker of claim 5, including a bush mounted within said hollow body, means for elastically urging said bush in the direction in which said male element is disconnected from said female element, said bush being provided with a flange adapted to penetrate inside said sleeve and to maintain said balls captive in said inner groove of said hollow body.

7. The safety circuit breaker of claim 6 including a fluid-connection element housed inside said female element and comprising at least one channel for passage of the pressurized fluid and an axial extension adapted to penetrate in said hollow body; said fluid connection element positioning said hollow body in said female element.

8. The safety circuit breaker of claim 1 including a fluid-connection element housed inside said female element and comprising at least one channel for passage of the pressurized fluid and an axial extension adapted to penetrate in a hollow body in which said sleeve is moveable between said first and second positions, said fluid-connection element positioning said hollow body in said female element, and a bush being in elastic abutment against said axial extension of said fluid-connection element inside said female element.

9. The safety circuit breaker of claim 1, wherein said at least one orifice for passage of pressurized fluid is made in a ring serving as positioning stop for a hollow body in which said sleeve is moveable between said first and second positions.

10. Safety circuit breaker for pressurized fluid handling installation, comprising two elements, male and female, which are adapted to be fixed to ends of two pipe portions and which are adapted to fit axially in each other, provoking the opening of an internal valve, the locking of the male element in the female element being effected with the aid of a plurality of balls which are mounted in a bore of a body of the female element and which are provided to engage radially in an annular groove made in an outer wall of a connector of the male element, said balls being carried by a slide, and means for elastically urging said slide, wherein said means for elastically urging said slide urge said slide towards a position in which said balls project inwardly of said slide, said slide then being in abutment against a stop limiting movement of said slide towards an inside of said female element, so that the introduction of said connector of said male element in said female element is prevented in this position.

11. The safety circuit breaker of claim 10, wherein said female element comprises a two-part body formed by a principal body containing said valve and an auxiliary body inside which said slide is mobile, said principal and auxiliary bodies being removably assembled.

12. The safety circuit breaker of claim 11, wherein said position towards which said means for elastically urging urges said slide corresponds to the abutment of said slide against said principal body.

13. The safety circuit breaker of claim 10, wherein said body of the female element comprises an inner annular groove for receiving said balls during a displacement of said slide against said means for elastically urging.

14. The safety circuit breaker of claim 10, wherein said connector of said male element comprises a central channel equipped with a tab for supporting a non-return valve.

15. The safety circuit breaker of claim 10 including a tool for displacing said slide against said means for elastically urging towards a position in which said balls are retracted, with the result that said balls do not project inwardly of said slide.

16. The safety breaker of claim 11 including a tool for displacing said slide against said means for elastically urging towards a position in which said balls are retracted, with the result that said balls do not project inwardly of said slide and said tool is adapted to be assembled with said auxiliary body, said tool being provided with a stop for displacement of said slide.

17. The safety circuit breaker of claim 15, wherein said tool comprises a hollow volume for receiving said connector of said male element.

* * * * *